July 12, 1949.
C. E. STENTZ
2,475,681
TANK BALL VALVE
Filed May 15, 1946
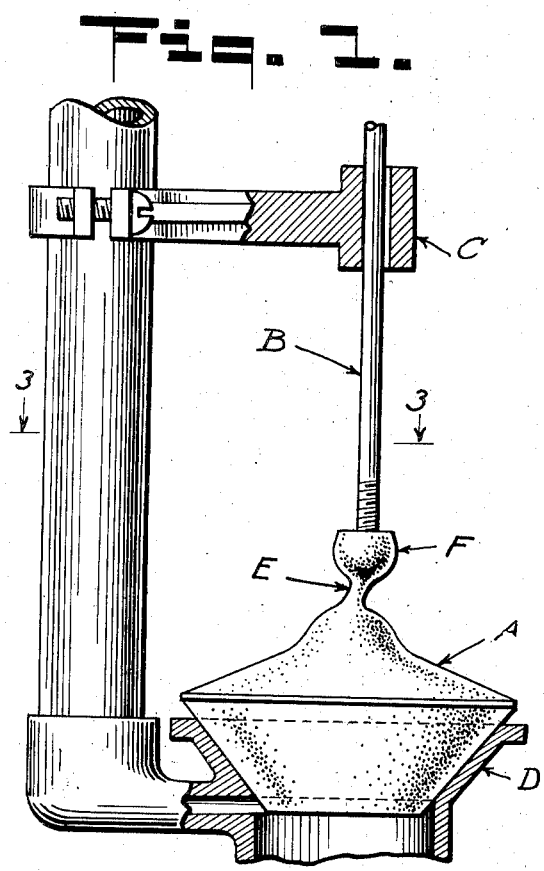
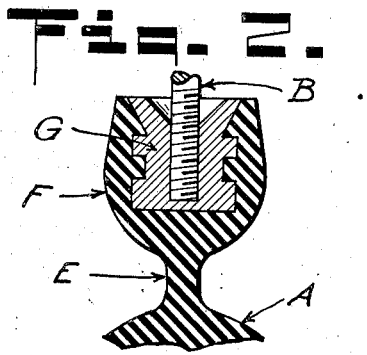
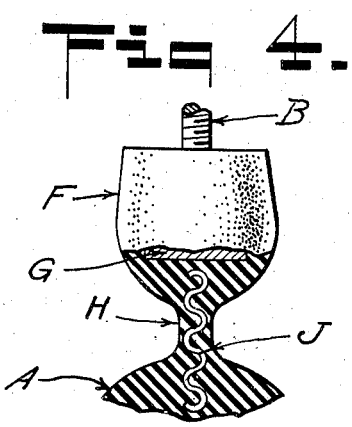
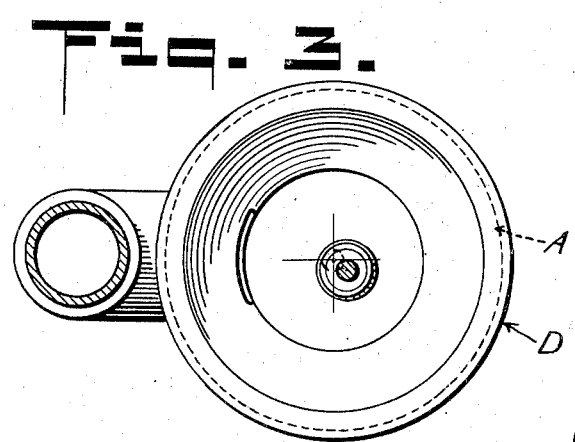
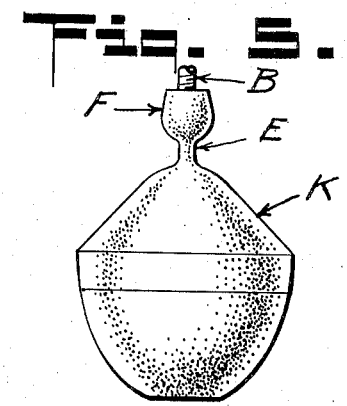
Inventor
CARL E. STENTZ
By R. S. Berry
Attorney Patented July 12, 1949

2,475,681

UNITED STATES PATENT OFFICE 2,475,681

TANK BALL VALVE

Carl E. Stentz, Alhambra, Calif., assignor to Radiator Specialty Company, a corporation of North Carolina Application May 15, 1946, Serial No. 669,794

1 Claim. (Cl. 4—56)

This invention relates to flexible valves of rubber, synthetic rubber or the like which are commonly used to control the flow of water from the flush tanks of toilets and the like and more particularly pertains to an improved means for joining such a valve to a guided rod or valve stem.

It is an object of this invention to provide a flush valve of the character next above described in which a highly flexible neck portion of greater flexibility and elasticity than the valve proper is constructed and arranged to accommodate the usual detachable connection of the valve with the customary guided stem by means of which latter the valve is unseated and seated, and at the same time permit the valve as a whole to have a free universal movement relative to the stem so that it will be self-aligning, that is, will readily accommodate itself to a proper seating regardless of misalignment of the valve assembly and other irregularities which frequently occur in the seating of such valves and the fact that guide and seat members are sometimes installed in misalignment. Flush valves as heretofore inflexibly joined to the stems are frequently urged in angular or irregular fashion towards their seats due to the force of the discharging water or other causes and because of the lack of flexibility in the joints thereof with the stems, the stems will bind and stick in their guides and prevent the valves from seating properly while at the time such valves are not permitted sufficient movement relative to the stems to assure proper seating thereof, the inherent flexibility of the valve itself being apparently insufficient to permit proper seating under such conditions.

The valve of the present invention is designed to eliminate the above noted objections and assure a proper seating action at all times through the use of a simple form of flexible neck portion projecting from the top of the valve as an integral part thereof and affording a universal movement of the valve proper relative to the stem under all conditions.

Another object of this invention is to provide in a valve such as described a flexible neck which is subject to ready and inexpensive formation at the time of molding the valve.

A further object is to provide a flush valve of the character described in which the flexible neck affording free relative movement of the valve proper relative to the valve stem also carries a fastening by means of which the stem is detachably connected with the valve.

Another object is to provide a means of flexible connection between a flush valve and its stem whereby the inherent flexibility of the valve proper heretofore relied upon to make the valve self-seating or self-aligning is a factor that can be eliminated to such extent that the valve members may be made more rigid and possibly of more durable and cheaper material at least as to the seating portions thereof to the end that a saving in cost of production, use of less material of a critical nature, and a reduction in bulk of the valve, are made possible.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a side elevation of a flush valve embodying the present invention and illustrating the self-aligning or self-seating action thereof, and being partly in section;

Fig. 2 is an enlarged fragmentary sectional view of the flexible neck by means of which the valve is joined to its stem for free universal movement relative thereto;

Fig. 3 is a sectional view on the line 3—3 of Fig. 1 showing a typical misalignment of the valve parts and omitting the valve member;

Fig. 4 is a fragmentary part sectional and part elevational view of a modified form of the invention; and Fig. 5 is a side view of another modified form of the invention.

Referring to the drawing more specifically, A designates a flexible valve embodying the present invention and which as here shown is of the usual hollow construction and made of thin flexible material such as rubber or the like, with a rod-like stem B attached thereto and mounted in the customary guides C whereby through the usual operating means (not shown) connected with the stem, the valve may be seated and unseated relative to the seat D.

In accordance with my invention I provide in connected relation with the upper side of the valve A at the center thereof a highly flexible and somewhat elastic neck E which is comparatively longer and of considerably less diameter than the usual boss or like projection provided on flush valves as heretofore made.

At its outer end the relatively thin, long and flexible neck is provided with an enlargement or head F in which a fastening such as the nut G is countersunk and embedded in the usual manner in this art to afford the screwing of the lower end of the stem thereto and the usual detachable connection of the valve with the stem.

As here shown the neck E is in integral formation with the material of the valve and of substantially circular cross section as is also the enlargement or head F but these parts may be of any suitable shape in cross section and joined to the valve as desired provided they permit of the free universal movement of the valve relative to the stem and serve the purposes herein described.

It will now be apparent that any misalignment or irregularity in the valve assembly regardless of how caused and which with flush valves that are inflexibly joined to their stems as heretofore has been the case, not infrequently prevented the valve member from seating properly, will not, due to my improved neck E, interfere with or prevent proper seating of the valve due to the fact that the flexibility and elasticity thereof permits the valve members to have a free universal movement relative to the stem to the end that the stem is prevented from binding and sticking in the guides and the valve itself will be self-aligning and self-seating should the stem and guide seat be out of alignment. A typical misalignment of the guide and seat member is illustrated in Fig. 1 which shows how the valve will seat by reason of the flexible neck E.

Moreover, due to the flexibility of the neck E and the self-aligning and self-seating action it affords the valve member proper it is possible to use valve members of various forms and shapes having less bulk than heretofore and made of cheaper and less critical materials, at least as to the seating portions of such valves, because the flexibility of the valves as a whole heretofore depended upon to make them seat properly need not be altogether provided in a flush valve having the flexible neck here shown and described.

In Fig. 4 a modified form of my invention includes a neck H of substantially the same dimensions as the neck E but is reinforced by means of a small and flexible sinuous spring element J embedded therein and completely enclosed thereby. In all other respects the valve and neck are of the same construction as shown in Figs. 1 and 2 and therefore are designated by the same reference characters as employed in Figs. 1 and 2. It should be noted, however, at this point that by reason of the reinforcing spring element J, the neck can be made of smaller diameter and longer without sacrificing strength and the spring can be likewise much smaller than shown. In any event the spring J serves as an effectual reinforcing element without appreciably reducing the flexibility of the neck and consequent self-aligning and self-seating action of the valve.

As shown in Fig. 5 the neck E of my invention is provided on a spherical valve K. This shows the adaptability of the neck formation hereof to flush valves of different shapes.

While I have shown and described specific embodiments of my invention I do not limit myself to the exact details of construction set forth, and the invention embraces such changes, modifications and equivalents of the parts and their formation and arrangement as come within the purview of the appended claim.

I claim:

In a flush tank valve, a valve member of flexible material adapted to be connected to a valve stem for movement into and out of contact with a valve seat, a flexible and somewhat elastic stem-connecting neck joined at one end to said valve member and projecting therefrom sufficiently to permit of free universal movement of the valve member relative to said valve stem, an enlargement on the outer end of said neck, a fastening carried by said enlargement for effecting connection of the neck with a valve stem whereby the valve member is subject to free universal movement relative to said stem, and a flexible resilient member embedded in said neck with ends embedded in said enlargement and in said valve member.

CARL E. STENTZ.

REFERENCES CITED

The following references are of record in the file of this patent:

UNITED STATES PATENTS

| Number | Name | Date |
|---|---|---|
| 1,775,934 | Delany | Sept. 16, 1930 |
| 1,947,627 | Wayne | Feb. 20, 1934 |